United States Patent [19]
Yagi et al.

[11] Patent Number: 5,861,120
[45] Date of Patent: Jan. 19, 1999

[54] METHOD OF PRODUCING WATERPROOF CONNECTOR HOUSING

[75] Inventors: Sakai Yagi; Motohisa Kashiyama; Takayoshi Endo, all of Shizuoka, Japan

[73] Assignee: Yazaki Corporation, Tokyo, Japan

[21] Appl. No.: 829,140

[22] Filed: Mar. 31, 1997

Related U.S. Application Data

[63] Continuation of Ser. No. 565,020, Nov. 30, 1995, abandoned.

[30] Foreign Application Priority Data

Dec. 2, 1994 [JP] Japan .................................. 6-299603

[51] Int. Cl.[6] ............................ B29C 33/10; B29C 70/80
[52] U.S. Cl. ........................... 264/255; 264/268; 264/273
[58] Field of Search .................... 264/250, 255, 264/266, 267, 268, 273, 276; 425/812, 116

[56] References Cited

U.S. PATENT DOCUMENTS

| | | | |
|---|---|---|---|
| 3,861,646 | 1/1975 | Douglas | 264/267 |
| 3,970,732 | 7/1976 | Slaats | 425/812 |
| 4,269,802 | 5/1981 | Linne | 264/267 |
| 4,410,479 | 10/1983 | Cyriax | 264/273 |
| 4,842,540 | 6/1989 | Endo et al. . | |
| 5,052,907 | 10/1991 | Matumoto et al. | 264/272.17 |

FOREIGN PATENT DOCUMENTS 63-221568  9/1988  Japan .............................. H01R 13/52

*Primary Examiner*—Angela Ortiz
*Attorney, Agent, or Firm*—Sughrue, Mion, Zinn, Macpeak & Seas, PLLC

[57] ABSTRACT

In a primary molding step, a connector housing having a hood portion is molded. In a secondary molding step, an elastic seal ring is molded on an inner side of the hood portion. Through holes are formed in the connector housing in the primary molding step which allow an elastic material to flow therethrough from a seal ring-forming portion on the inner side of the hood portion to an outer side of the hood portion, and which retain part of the seal ring formed at the seal ring-forming portion when the elastic material is cured. An air reservoir portion is formed in a secondary mold, which communicates with outer open ends of the through holes in the connector housing in the secondary molding step.

6 Claims, 3 Drawing Sheets

METHOD OF PRODUCING WATERPROOF CONNECTOR HOUSING

This is a continuation of application Ser. No. 08/565,020 filed Nov. 30, 1995, now abandoned.

BACKGROUND OF THE INVENTION

1. Field of the Invention

This invention relates to a method of molding an elastic seal ring integrally on an inner side of a hood portion of a connector housing, the hood portion being adapted to fit on a mating connector housing so as to cause the seal ring to form a watertight seal between the two connector housings.

2. Related Art

One conventional molding method of the type described is disclosed in Japanese Patent Examined Publication No. 5-23030.

FIG. 4 shows a waterproof connector housing A produced by this conventional method. The housing A includes a housing body 1, and a hood portion 3 of a larger size connected to a front end of the housing body 1 through a stepped portion 2, the hood portion 3 being adapted to receive a mating connector housing therein. An elastic seal ring 4 is formed integrally at an inner end portion of the hood portion 3. The elastic seal ring 4 has retaining piece portions 4a which are intimately engaged and held respectively in through holes 3a formed through a peripheral wall of the hood portion 3, the axis of each through hole 3a being perpendicular to the axis of the housing. The housing body 1 has terminal receiving chambers 1a formed therein.

FIG. 5 shows a mold for the primary molding operation of the housing A, and FIG. 6 shows a mold for secondary molding purposes.

In FIG. 5, the upper mold 5 and the lower mold 6 are clamped together to provide a cavity 9, corresponding to a housing-forming portion, therebetween. First, in the primary molding operation, the upper mold 5 is closed in a direction of the axis of the housing A to be molded, and the connector housing is injection molded according to an ordinary procedure. At this time, slide cores 8 are received respectively in transverse holes 7 so as to form passages (retaining holes) 3a through which an elastic material is poured into a seal ring-forming portion to be formed at the inner side of the hood portion. The passages 3a serve also as retaining holes for retaining the retaining piece portions 4a.

Then, in the secondary molding operation, the upper mold 5 is removed, and instead another upper mold 5', having a cavity 10 corresponding to the elastic seal ring-forming portion, is clamped relative to the lower mold 6 holding the housing 1, and the liquid elastic sealing material is poured into the seal ring-forming portion through the transverse holes 7 and the passages 3a from which the slide cores 7 are retracted.

In the above forming method, even during the formation of the elastic seal ring 4 in the secondary molding operation, the slide cores 7, which slide in directions perpendicular to the direction of clamping of the upper and lower molds 5' and 6, must be used. Therefore the mold is complicated, and the manufacturing cost is high.

SUMMARY OF THE INVENTION

The present invention has been made in view of the above problems, and an object of the invention is to provide a method in which a mold for secondary molding purposes is simplified in construction so that a waterproof connector housing can be produced at a lower cost.

To achieve the above object, the present invention provides a method of producing a waterproof connector housing comprising a primary molding step of molding the connector housing having a hood portion, and a secondary molding step of molding an elastic seal ring integrally on an inner side of the hood portion; wherein through holes are formed in the connector housing in the primary molding step, the through holes allowing an elastic material to flow therethrough from a seal ring-forming portion on the inner side of the hood portion to an outer side of the hood portion, and the through holes retaining part of the seal ring formed at the seal ring-forming portion when the elastic material is cured; and an air reservoir portion is formed in a secondary mold, the air reservoir portion communicating with outer open ends of the through holes in the connector housing in the secondary molding step.

According to the present invention, in the secondary molding step, the elastic material for forming the elastic seal ring is poured from the inner side of the hood portion to the outer side thereof, utilizing the through holes in the connector housing and the air reservoir portion. This method obviates the need for any slide core movable in a direction perpendicular to a direction of closing or clamping of the secondary mold.

Therefore, the mold is simplified in construction, and the cost of the mold can be greatly reduced.

DETAILED DESCRIPTION OF THE PREFERRED EMBODIMENTS

Figure 1:
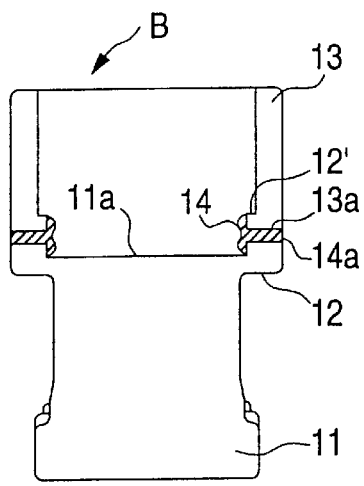
FIG. 1 is a cross-sectional view of a waterproof connector housing produced by a method of the present invention.

FIG. 1 shows a waterproof connector housing B provided according to the present invention.

The housing B includes a housing body 11, and a hood portion 13 of a larger size connected to a front end of the housing body 11 through a first stepped portion 12, the hood portion 13 being designed to receive a mating connector housing therein. An elastic seal ring 14 is formed integrally at an inner end portion of the hood portion 13.

More specifically, the hood portion 13 has a second stepped portion 12' spaced a predetermined distance from a plane 11a of connection between the housing body 11 and a mating housing. The elastic seal ring 14 is formed at an area between the second stepped portion 12' and the connection plane 11a over the entire periphery. Retaining piece portions 14a of the elastic seal ring 14 are intimately held respectively in through holes (retaining holes) 13a in the hood portion 13, and are prevented from being easily disengaged therefrom. A plurality of terminal receiving chambers (not shown) are provided within the housing body 11.

Thus, the housing B is similar in construction to the conventional waterproof connector housing A, and the housing body 11 and the hood portion 13 are molded first by a mold (not shown) in a primary molding step.

Figure 2:
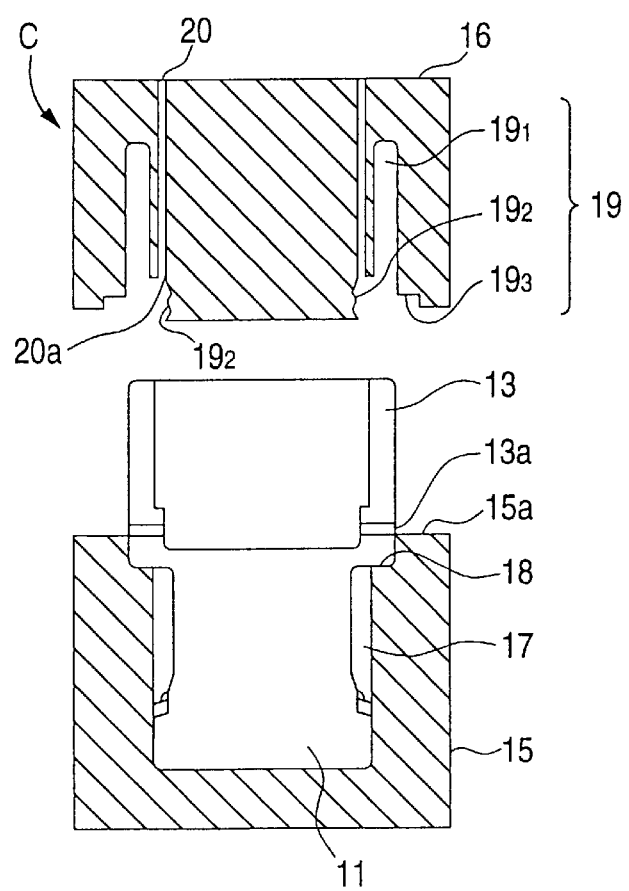
FIG. 2 is a cross-sectional view of a mold used in the method of the invention.
Figure 3:
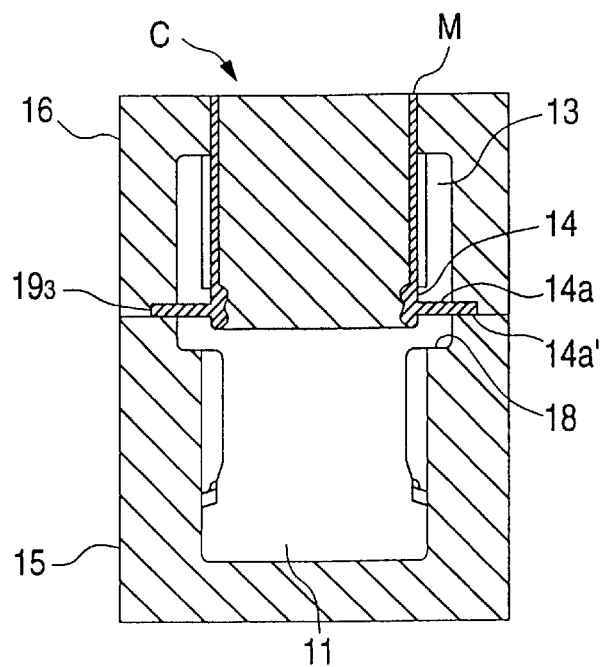
FIG. 3 is a view explanatory of a molding operation of the waterproof connector housing, using the mold of FIG. 2.
Figure 4:
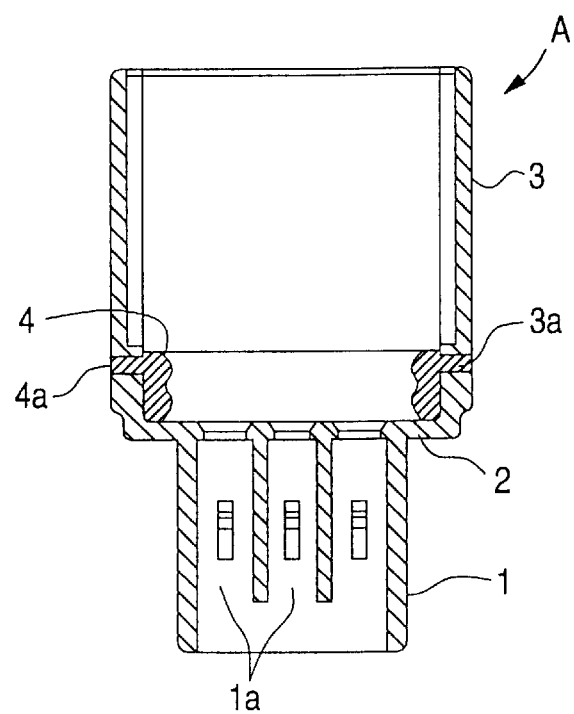
FIG. 4 is a cross-sectional view of a conventional waterproof connector housing.
Figure 5:
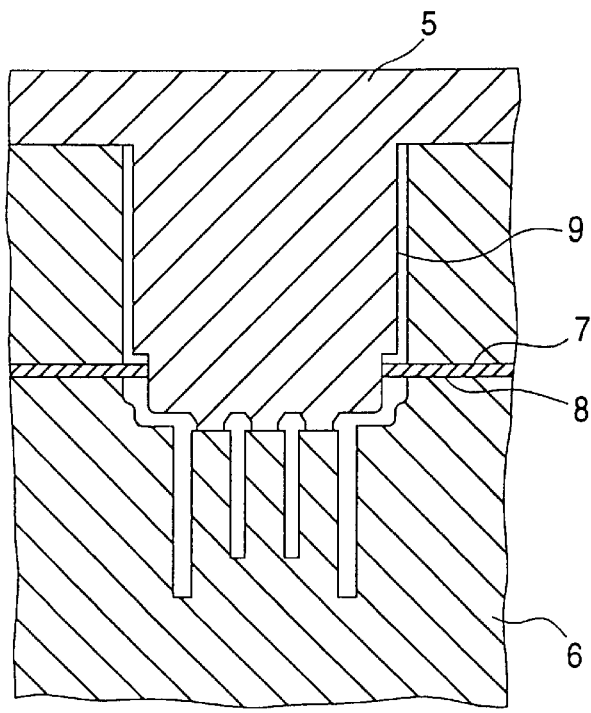
FIG. 5 is a cross-sectional view of molds used in a primary molding operation of the housing of FIG. 4.
Figure 6:
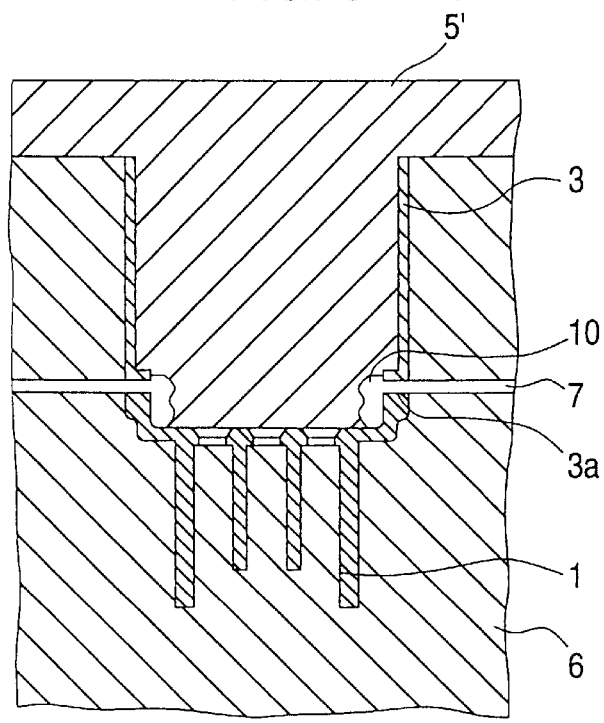
FIG. 6 is a cross-sectional view of molds used in a secondary molding operation of the housing of FIG. 4.

FIG. 2 shows a secondary mold C for forming the elastic seal ring, and this mold C comprises a lower mold 15 and an upper mold 16.

The lower mold 15 has a recess 17 for receiving the housing body 11 therein, and the recess is enlarged at its upper end over an entire periphery thereof to provide a seat on which the proximal end of the hood portion 13 is adapted to rest. The depth of this seat 18 is equal to the distance between the bottom of the hood portion 13 and the through holes 13a, and when the hood portion 13 is caused to rest on the seat 18, an upper end surface 15a of the lower mold 15 lies flush with bottom surfaces of the through holes 13a.

The lower mold 15 and the upper mold 16 are clamped together in a direction of the axis of the waterproof connector housing B, and in this clamped condition, a cavity 19 corresponding in shape to the connector housing B is formed therein.

More specifically, the upper mold 16 has a first cavity $19_1$ corresponding to that portion of the hood portion 13 extending upwardly from the upper end surface 15a of the lower mold 15, a second cavity $19_2$ corresponding to an elastic seal ring-forming portion, and a third cavity $19_3$ for communicating with outer open ends of the through holes 13a in the hood portion 13. The third cavity $19_3$ is formed at an area of contact between the upper and lower molds 16 and 15, and serves as an air reservoir portion when pouring a liquid elastic sealing material.

Reference numeral 20 denotes a runner for pouring the liquid elastic sealing material from the upper mold 16 into the cavity 19, and the runner 20 extends in the axial direction, and its gate 20a is open to the second cavity $19_2$ for forming the elastic seal ring.

The secondary molding process will now be described.

The connector housing, produced by the primary molding step, is inserted into the lower mold 15, with the proximal end of the hood portion 13 resting on the seat 18. Then, the upper mold 16, having the cavity $19_2$ corresponding to the seal ring-forming portion in the hood portion 13 of the housing B, is clamped to the lower mold 15.

Next, the elastic material M of high fluidity, such as liquid silicone and a thermoplastic elastomer, is introduced into and fills the cavity $19_2$ through the runner 20 and the gate 20a, and further fills the outer third cavity $19_3$ through the through holes 13a in the hood portion 13.

Although the elastic material M is high in fluidity, because the upper and lower molds 16 and 15 are held in intimate contact with each other, and the third cavity $19_3$ is closed by the lower mold 15, the elastic material M will not leak through the area of contact between the two molds.

After the elastic material is cured, the molds are separated from each other, with the molded product held in the lower mold 15, and the cured material is ejected toward the upper mold 16 by ejector pins (not shown), thereby separating the elastic material M, cured in the runner 20, from the molded elastic seal ring 14 at an injection port of the gate 20a, and the molded product is removed from the lower mold 15.

Finally, excess portions 14a' of the elastic seal ring 14 projecting outwardly from the hood portion 13 are cut off.

In this manner, there is obtained the waterproof connector housing B having the elastic seal ring 14 molded integrally on the inner side of the hood portion 13, as shown in FIG. 1.

The air which is compressed when the elastic material M fills the mold during the formation of the elastic seal ring 14 is forced into the cavity $19_3$ through the cavity $19_2$ and the through holes 13a. Thus, the cavity $19_3$ performs the function of an air reservoir. Therefore, the flow of the elastic material M in the through holes 13a will not be uneven, and the quality of the elastic seal ring 14 will be consistent.

As described above, according to the present invention, there is provided a method of producing a waterproof connector housing comprising the primary molding step of molding the connector housing having a hood portion, and the secondary molding step of molding an elastic seal ring integrally on the inner side of the hood portion; characterized in that through holes are formed in the connector housing in the primary molding step, and the through holes allow the elastic material to flow therethrough from the seal ring-forming portion on the inner side of the hood portion to the outer side of the hood portion, and the through holes retain part of the seal ring formed at the seal ring-forming portion when the elastic material is cured; and an air reservoir portion is formed in the secondary mold, the air reservoir portion communicating with outer open ends of the through holes in the connector housing in the secondary molding step. Therefore, there is no need to use any slide core or slide mold movable in a direction perpendicular to the direction of the axis of the mold, the secondary mold is simplified in construction, and the cost of the mold is greatly reduced. Therefore, the waterproof connector housing can be produced at a low cost.

What is claimed is:

1. A method of producing a waterproof connector housing comprising the steps of:

molding the connector housing, which has through holes, in a primary mold, said primary mold comprising a first upper mold and a lower mold;

forming an air reservoir portion in a secondary mold, said secondary mold comprising a second upper mold and said lower mold, said air reservoir portion being disposed at an interface of said second upper mold and said lower mold, wherein said lower mold has an upper face, said second upper mold has a lower face, and said air reservoir portion is defined by said upper face and said lower face, said air reservoir portion communicating with outer open ends of said through holes in said connector housing to evacuate air from said secondary mold; and molding, in said secondary mold, a seal ring on the inner side of a hood portion of the housing by allowing an elastic material to flow, along a flow path, through said through holes from a seal ring-forming portion on said inner side of said hood portion to an outer side of said hood portion and at least partially into said air reservoir, said through holes retaining part of said seal ring when said elastic material is cured.

2. A method of producing a waterproof connector housing as claimed in claim 1, wherein said primary molding step is to mold the connector housing having said hood portion, and said secondary molding step is to mold said elastic seal ring integrally on said inner side of the hood portion.

3. A method of producing a waterproof connector housing as claimed in claim 1, wherein said second upper mold defines a molding cavity and said air reservoir includes an inlet in direct communication with said molding cavity.

4. A method of producing a waterproof connector housing as claimed in claim 1, wherein said air reservoir dead ends said flow path within a space defined by said second upper mold and said lower mold.

5. A method of producing a waterproof connector housing as claimed in claim 1, wherein said second upper mold includes a cavity for retaining the connector and said air reservoir is directly connected to said cavity.

6. A method of producing a waterproof connector housing as claimed in claim 1, wherein said step of molding, in said secondary mold, includes allowing an elastic material to flow through said through holes from a seal ring-forming portion on said inner side of said hood portion of the housing, to an outer side of said hood portion, and then directly into said air reservoir.

* * * * *